US009640892B2

(12) United States Patent
Wang et al.

(10) Patent No.: US 9,640,892 B2
(45) Date of Patent: May 2, 2017

(54) ELECTRONIC CARD CONNECTOR

(71) Applicant: Molex, LLC, Lisle, IL (US)

(72) Inventors: Hong-Liang Wang, Chengdu (CN);
Shang-Xiu Zeng, Chengdu (CN); Kian Heng Lim, Singapore (SG)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 15/266,462

(22) Filed: Sep. 15, 2016

(65) Prior Publication Data

US 2017/0093072 A1    Mar. 30, 2017

(30) Foreign Application Priority Data

Sep. 30, 2015   (CN) .................... 2015 2 0771337 U (51) Int. Cl.
*H01R 24/00* (2011.01)
*H01R 13/26* (2006.01)
*H01R 13/645* (2006.01)
*H01R 13/635* (2006.01)

(52) U.S. Cl.
CPC .......... *H01R 13/26* (2013.01); *H01R 13/635* (2013.01); *H01R 13/6456* (2013.01)

(58) Field of Classification Search
CPC .. H01R 13/6456; H01R 13/635; H01R 13/26; H01R 13/642; H01R 13/64; G06K 13/08
See application file for complete search history.

(56) References Cited

U.S. PATENT DOCUMENTS

| | | | |
|---|---|---|---|
| 6,101,372 A | 8/2000 | Kubo | |
| 6,602,096 B1* | 8/2003 | Kronestedt | G06K 7/0021 |
| | | | 439/188 |
| 7,112,075 B1* | 9/2006 | Su | G06K 7/0021 |
| | | | 439/159 |
| 7,232,321 B1* | 6/2007 | Lai | G06K 13/08 |
| | | | 439/159 |
| 7,726,991 B2 | 6/2010 | Ma et al. | |
| 8,371,866 B1* | 2/2013 | Su | G06K 13/0862 |
| | | | 439/159 |
| 9,444,196 B2* | 9/2016 | Wang | G06K 19/00 |
| 2003/0032317 A1* | 2/2003 | Ooya | G06K 7/0021 |
| | | | 439/159 |

(Continued)

FOREIGN PATENT DOCUMENTS

| CN | 202977785 U | 6/2013 |
|---|---|---|
| CN | 103378478 A | 10/2013 |

(Continued)

*Primary Examiner* — Briggitte R Hammond
(74) *Attorney, Agent, or Firm* — James A. O'Malley (57) ABSTRACT

An electronic card connector includes a metal shell, a terminal block and a tray. The metal shell is provided on a circuit board and cooperates with the circuit board to define a slot having an entrance. The tray has an insertion end which first enters the slot of the metal shell and two receiving portions which are respectively parallel to two sides of the inserting-ejecting direction and respectively correspond to two limiting arms of the metal shell. The tray further has two interference oblique surfaces adjacent to the insertion end, when the tray is improperly inserted under a state that the tray is turned upside down, the two interference oblique surfaces respectively abut against the two limiting arms, therefore the tray cannot enter into the slot.

10 Claims, 13 Drawing Sheets

(56) References Cited

U.S. PATENT DOCUMENTS

| | | | | |
|---|---|---|---|---|
| 2005/0221681 A1* | 10/2005 | Shobara | ................ | H01R 13/64 |
| | | | | 439/680 |
| 2009/0280657 A1* | 11/2009 | Satoh | .................... | H01R 31/06 |
| | | | | 439/62 |
| 2014/0017920 A1* | 1/2014 | Takasaki | .............. | H01R 12/721 |
| | | | | 439/157 |
| 2014/0315404 A1* | 10/2014 | Wang | .................... | G06K 13/08 |
| | | | | 439/159 |

FOREIGN PATENT DOCUMENTS

| | | |
|---|---|---|
| CN | 104038586 A | 9/2014 |
| CN | 204011822 U | 12/2014 |
| CN | 204011895 U | 12/2014 |
| CN | 204333327 U | 5/2015 |
| CN | 204680779 U | 9/2015 |

\* cited by examiner

ELECTRONIC CARD CONNECTOR

RELATED APPLICATIONS

This application claims priority to Chinese Application No. 201520771337.2, filed Sep. 30, 2015, which is incorporated herein by reference in its entirety.

TECHNICAL FIELD

The present disclosure relates to an electronic card connector, and more specifically relates to an electronic card connector comprising a tray.

BACKGROUND ART

Generally, an electronic card connector typically comprises a tray for carrying an electronic card with a small volume, such as a SIM card, or carrying a plurality of electronic cards at the same time, so as to facilitate use and operation of insertion and ejection of the electronic card(s).

In order to prevent an operator from improperly inserting the electronic card, there is a fool-proof (i.e. prevent improper insertion) design on the electronic card connector, for example Chinese patent issuance publication No. CN204011822U discloses a card connector comprising a metal shell and a tray for carrying an electronic card. The metal shell is provided on a circuit board and cooperates with the circuit board to form an inserting cavity, a front end of the metal shell is provided with a fool-proof bended arm formed by bending the metal shell toward the inserting cavity, the tray is provided with a receiving portion corresponding to the fool-proof bended arm. When the tray is properly inserted into the inserting cavity, the receiving portion provides a receiving space for receiving the fool-proof bended arm, so that the tray can be smoothly inserted into the inserting cavity; when the tray is improperly inserted (that is the tray is turned upside down and inserted) into the inserting cavity, the tray is blocked outside the inserting cavity, thereby preventing the tray from being improperly inserted.

However, when the tray is improperly inserted, the fool-proof bended arm blocks the try by use of an edge of the fool-proof bended arm, but the edge is thin and small, and is as sharp as a blade, the edge will easily damage the tray, or even scrape off corresponding plastic of the tray, therefore the tray easily forcedly squeezes into the inserting cavity.

SUMMARY

Therefore, the present disclosure provides an electronic card connector, the structure of which is not easily damaged.

Therefore, in some embodiments, an electronic card connector of the present disclosure is provided on a circuit board and comprises a metal shell, a terminal block and a tray. The metal shell is provided on the circuit board, the metal shell cooperates with the circuit board to define a slot. The metal shell has a top plate which is spaced apart from and faces the circuit board, two side plates which are respectively connected to two sides of the top plate and face each other, and two limiting arms which are respectively bent from two end edges of the two side plates adjacent to an entrance of the slot and perpendicular to the top plate and extend toward each other. Each limiting arm is spaced apart from the top plate and has a side stopping surface toward the other limiting arm and a front stopping surface toward the outside of the slot. The terminal block is provided on the circuit board and positioned in the slot. The tray is inserted into and ejected from the slot via the entrance of the slot along an inserting-ejecting direction and used to carry an electronic card to be received in the slot so as to allow the electronic card and the terminal block to be electrically connected, the tray has an insertion end which first enters the slot and two receiving portions which are respectively parallel to two sides of the inserting-ejecting direction, the two receiving portions respectively correspond to the two limiting arms, so that when the tray is properly inserted, the tray enters into the slot without blocking of the two limiting arms; the tray further has two interference oblique surfaces respectively parallel to the two sides of the inserting-ejecting direction and adjacent to the insertion end, a distance between the two interference oblique surfaces gradually increases along a direction away from the insertion end, when the tray is improperly inserted under a state that the tray is turned upside down, each interference oblique surface abut against a boundary between the side stopping surface and the front stopping surface of the corresponding limiting arm, so that the tray cannot enter into the slot.

In some embodiments, the two limiting arms extend into the slot.

In some embodiments, the tray has two side surfaces respectively facing the two side plates of the metal shell, a bottom surface facing the circuit board, and a top surface opposite to the bottom surface, the two receiving portions are respectively recessed from the two side surfaces adjacent to the bottom surface.

In some embodiments, the two side surfaces of the tray each are respectively formed with a latching block and a latching groove, the latching block and the latching groove of each side surface are provided along the inserting-ejecting direction and adjacent to each other; the two side plates of the metal shell each have a linear elastic section which is separated from the top plate, and the elastic section has a latching portion bent and protruding toward the inside of the slot; when the tray is inserted into the slot and reaches a predetermined position, the two latching portions of the metal shell are respectively latched into the two latching grooves at the two sides of the tray and respectively stop the two latching blocks to move toward the entrance of the slot so as to limit the tray.

In some embodiments, the two side plates of the metal shell further each have two mounting sections respectively connected with the two ends of the corresponding elastic section, each mounting section has at least a soldering portion soldered to the circuit board.

Therefore, in some embodiments, an electronic card connector of the present disclosure is provided on a circuit board and comprises a metal shell, a terminal block and a tray. The metal shell is provided on the circuit board, the metal shell cooperates with the circuit board to define a slot. The metal shell has a top plate which is spaced apart from and faces the circuit board, two side plates which are respectively connected to two sides of the top plate and face each other, and two limiting arms which are respectively bent from an end edge of the two side plates adjacent to an entrance of the slot and perpendicular to the top plate and extend toward each other. Each limiting arm is spaced apart from the top plate and has a front stopping surface toward the outside of the slot. The terminal block is provided on the circuit board and positioned in the slot. The tray is inserted into and ejected from the slot from the entrance of the slot along an inserting-ejecting direction and used to carry an electronic card to be received in the slot so as to allow the electronic card and the terminal block to be electrically connected. The tray has an insertion end which first enters the slot and two receiving portions which are respectively parallel to the two sides of the inserting-ejecting direction, the two receiving portions respectively correspond to the two limiting arms, so that when the tray is properly inserted, the tray enters into the slot without blocking of the two limiting arms; when the tray is improperly inserted under a state that the tray is turned upside down, two parts of the insertion end respectively adjacent to the two sides of the insertion end respectively abut against the two front stopping surface of the two limiting arms, so that the tray cannot enter into the slot.

The present disclosure at least has the following beneficial effects: when the tray is improperly inserted (that is the tray is turned upside down and inserted), because the side stopping surface of the limiting arm abuts against the interference oblique surface of the tray, the force applied by the interference oblique surface may be dispersed toward different directions, thereby reducing the risk of scrapping the tray and assuring the fool-proof function. Similarly, because the front stopping surface of the limiting arm stops the tray, the contact area between each limiting arm and the tray is larger, the force that the tray applies on each limiting arm may be dispersed, thereby reducing the risk of scrapping the tray, and also ensuring the fool-proof function. Moreover, the latching portion bent from the linear elastic section has a higher structure strength, so the latching portion can allow repeated insertion and ejection of the tray and the latching portion will not be deformed.

BRIEF DESCRIPTION OF THE DRAWINGS

The other features and effects of the present disclosure will be apparent through detailed description of embodiments with referring to Figures, and in which.

DETAILED DESCRIPTION OF THE PREFERRED EMBODIMENTS

Referring to FIG. 1 through FIG. 5, an electronic card connector of a first embodiment of the present disclosure is provided on a circuit board 1, and comprises a metal shell 2, three terminal blocks 3 and a tray 4.

The metal shell 2 is provided on the circuit board 1 and the metal shell 2 cooperates with the circuit board 1 to define a slot 21. The metal shell 2 has a top plate 22 which is spaced apart from and faces the circuit board 1, two side plates 23 which are respectively connected to two sides of the top plate 22 and face each other, and two limiting arms 24 which are respectively bent from two end edges of the two side plates 23 adjacent to an entrance of the slot 21 and perpendicular to the top plate 22 and extend toward each other, each limiting arm 24 is spaced apart from the top plate 22 and has a side stopping surface 241 toward the other limiting arm 24 and a front stopping surface 242 toward the outside of the slot 21. In the embodiment, the two limiting arms 24 extend into the slot 21, however, the two limiting arms 24 may also outside the slot 21, that is, the two limiting arms 24 protrude relatively to a front end edge of the top plate 22, and the present embodiment is not limited to this.

Figure 1:
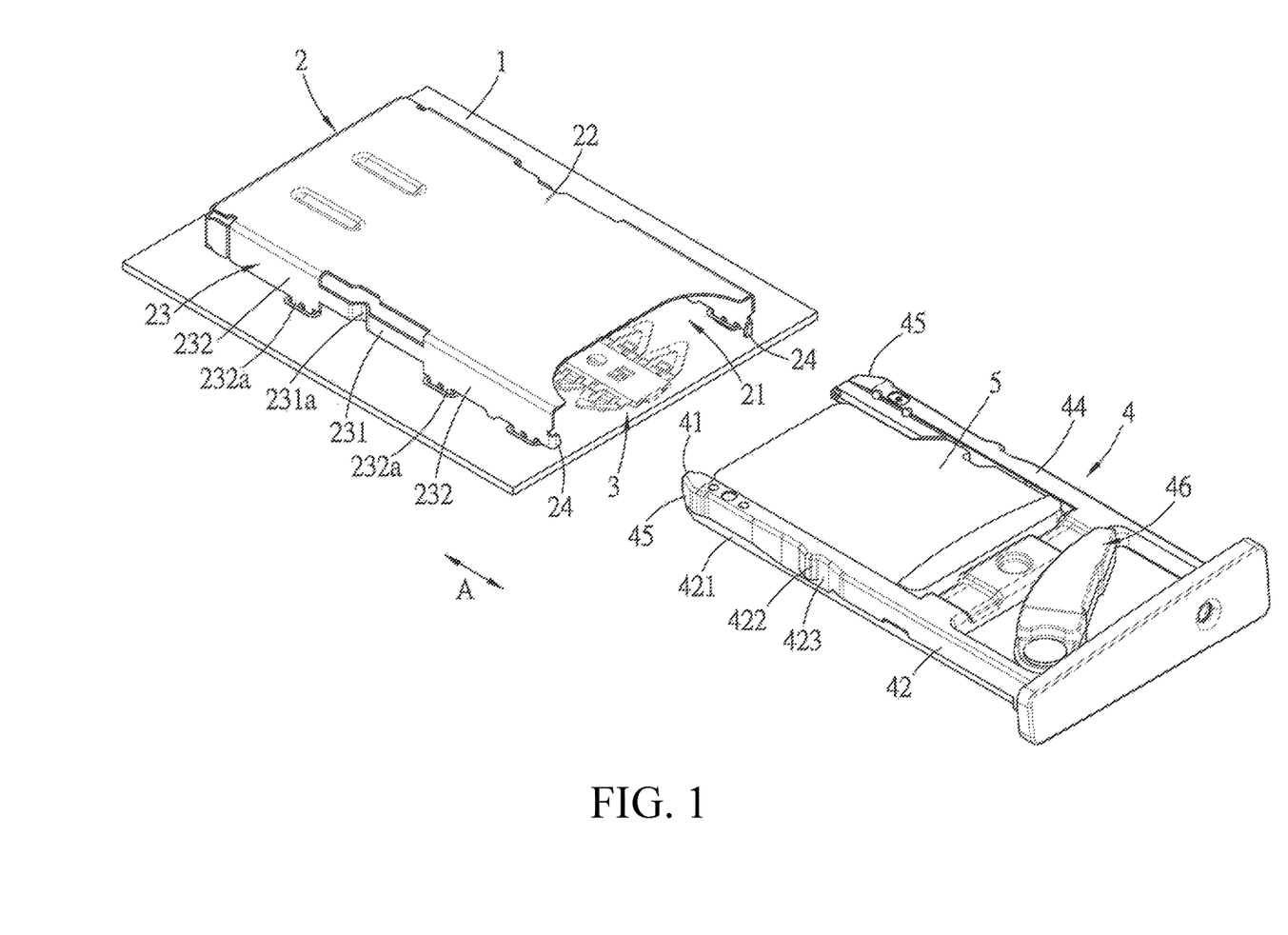
FIG. 1 is an exploded perspective view illustrating that a tray is not inserted into a slot in an electronic card connector of a first embodiment of the present disclosure.
Figure 2:
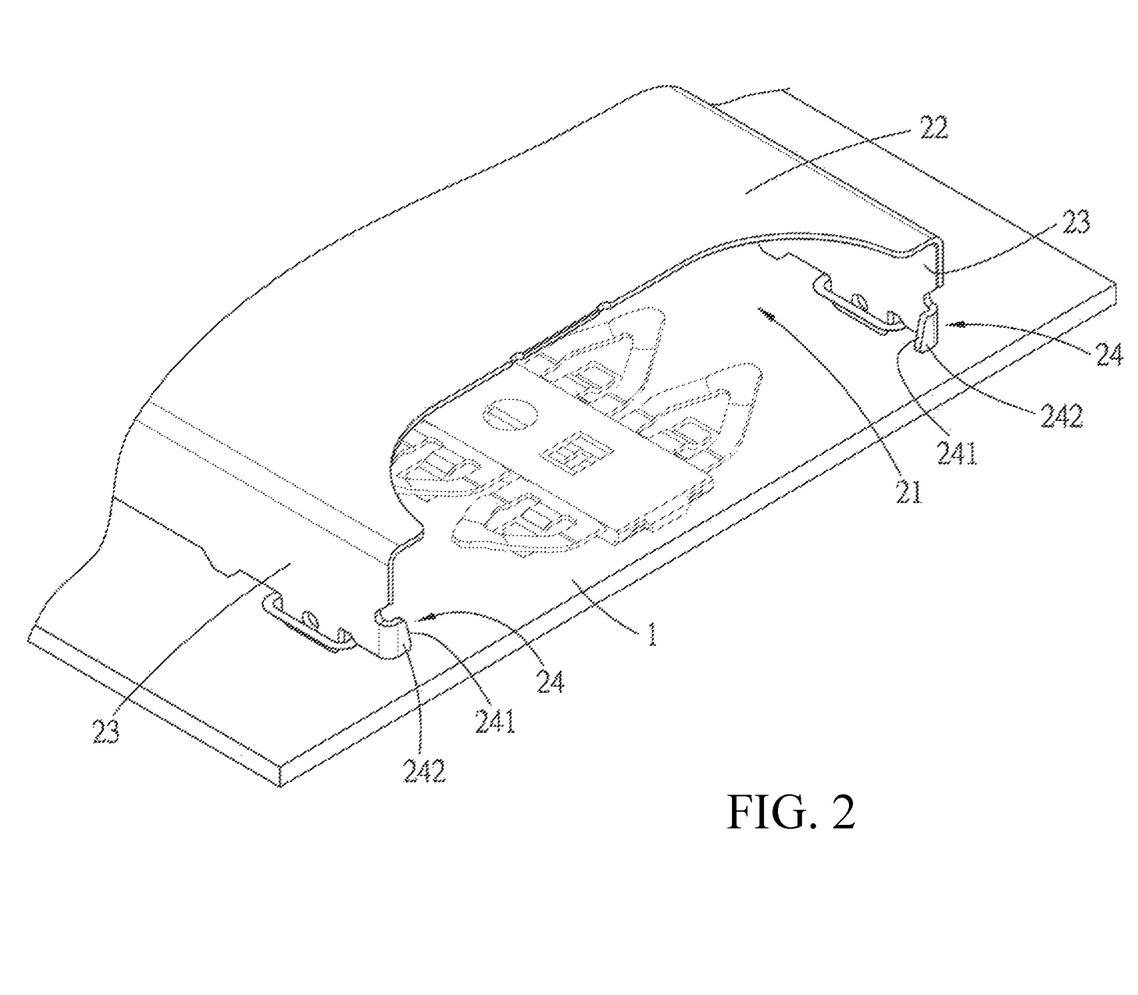
FIG. 2 is a partial perspective view illustrating two limiting arms of a metal shell of the first embodiment.
Figure 3:
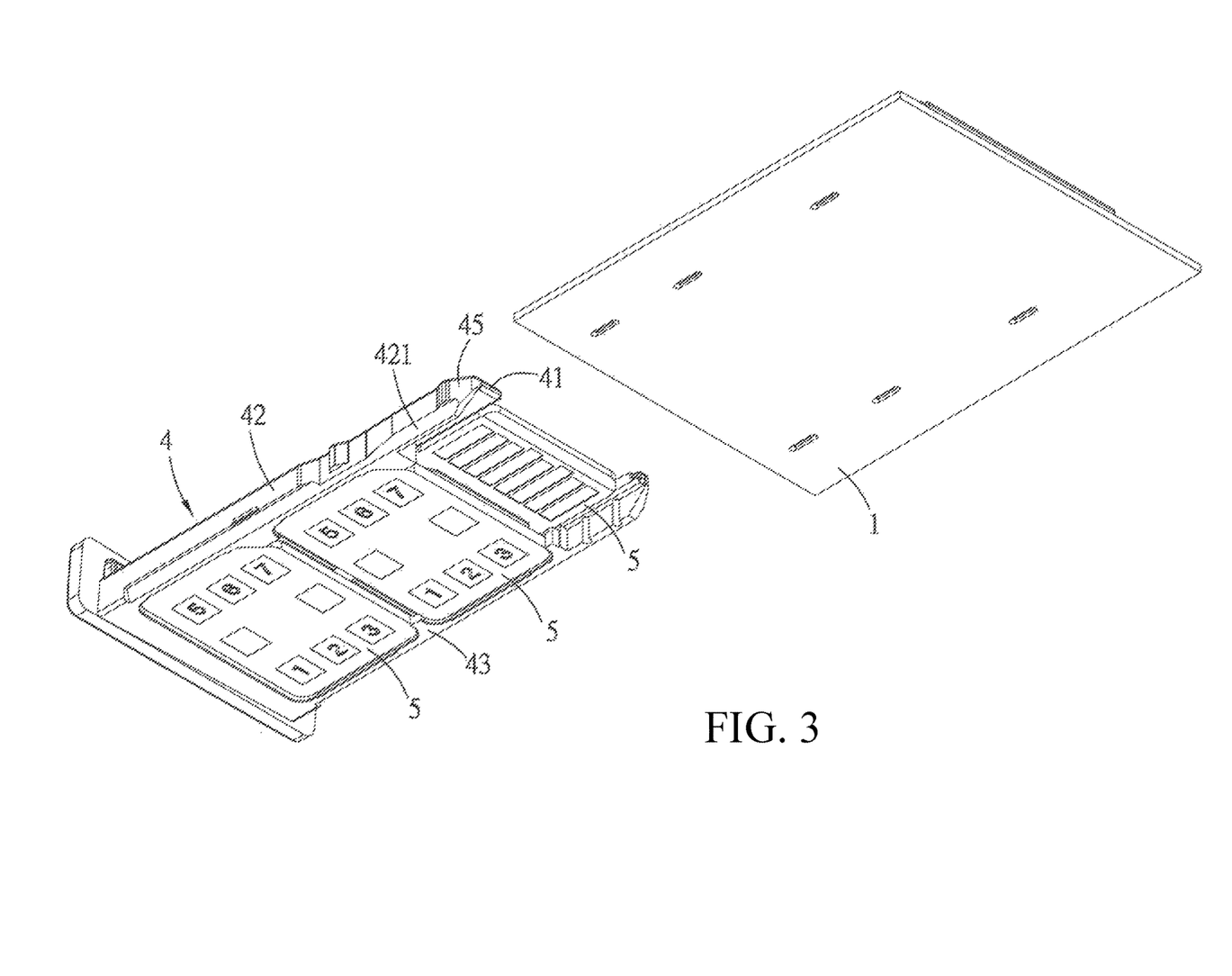
FIG. 3 is a view of FIG. 1 viewed from another angle and illustrating that the tray of the first embodiment carries three electronic cards.
Figure 4:
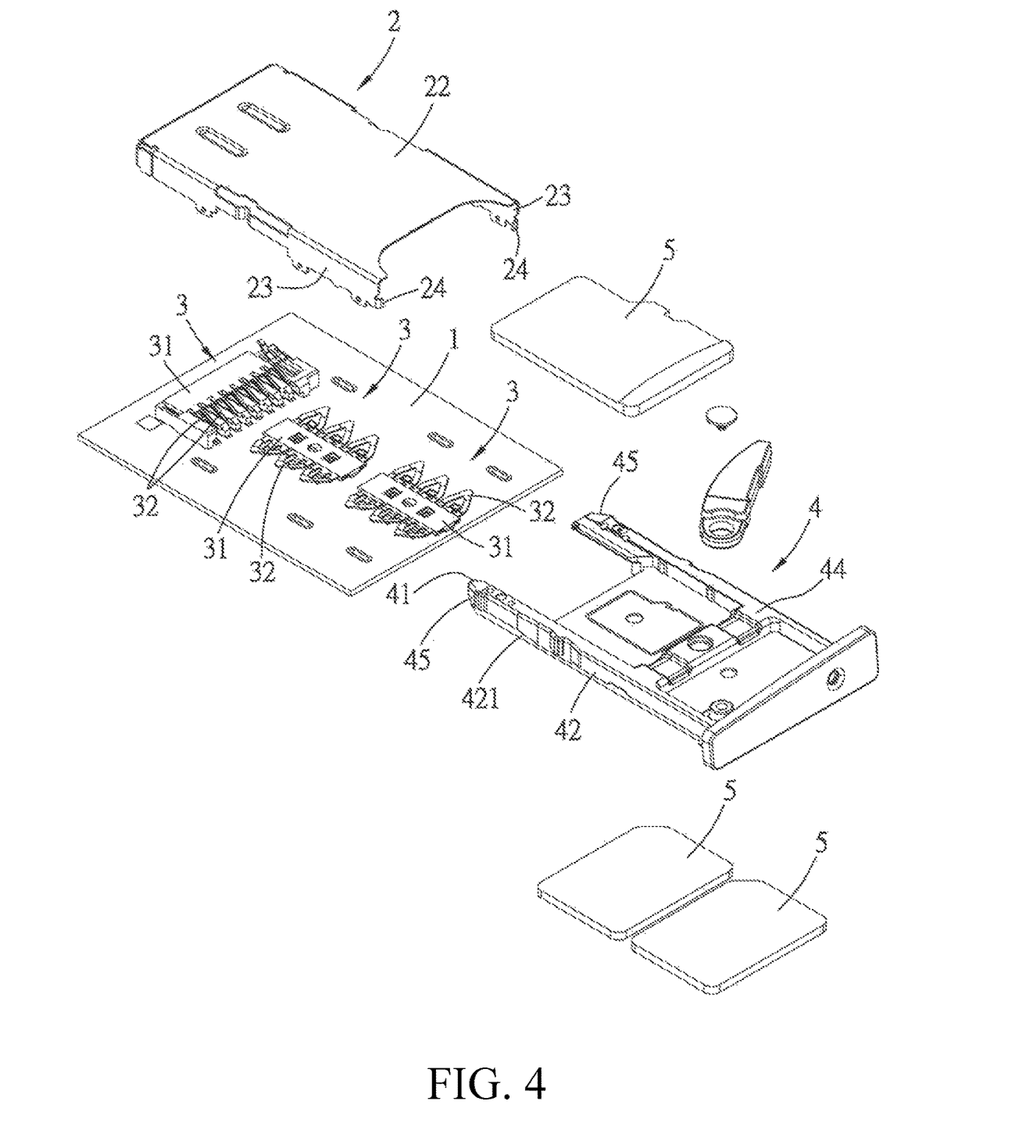
FIG. 4 is an exploded perspective view illustrating components of the first embodiment.
Figure 5:
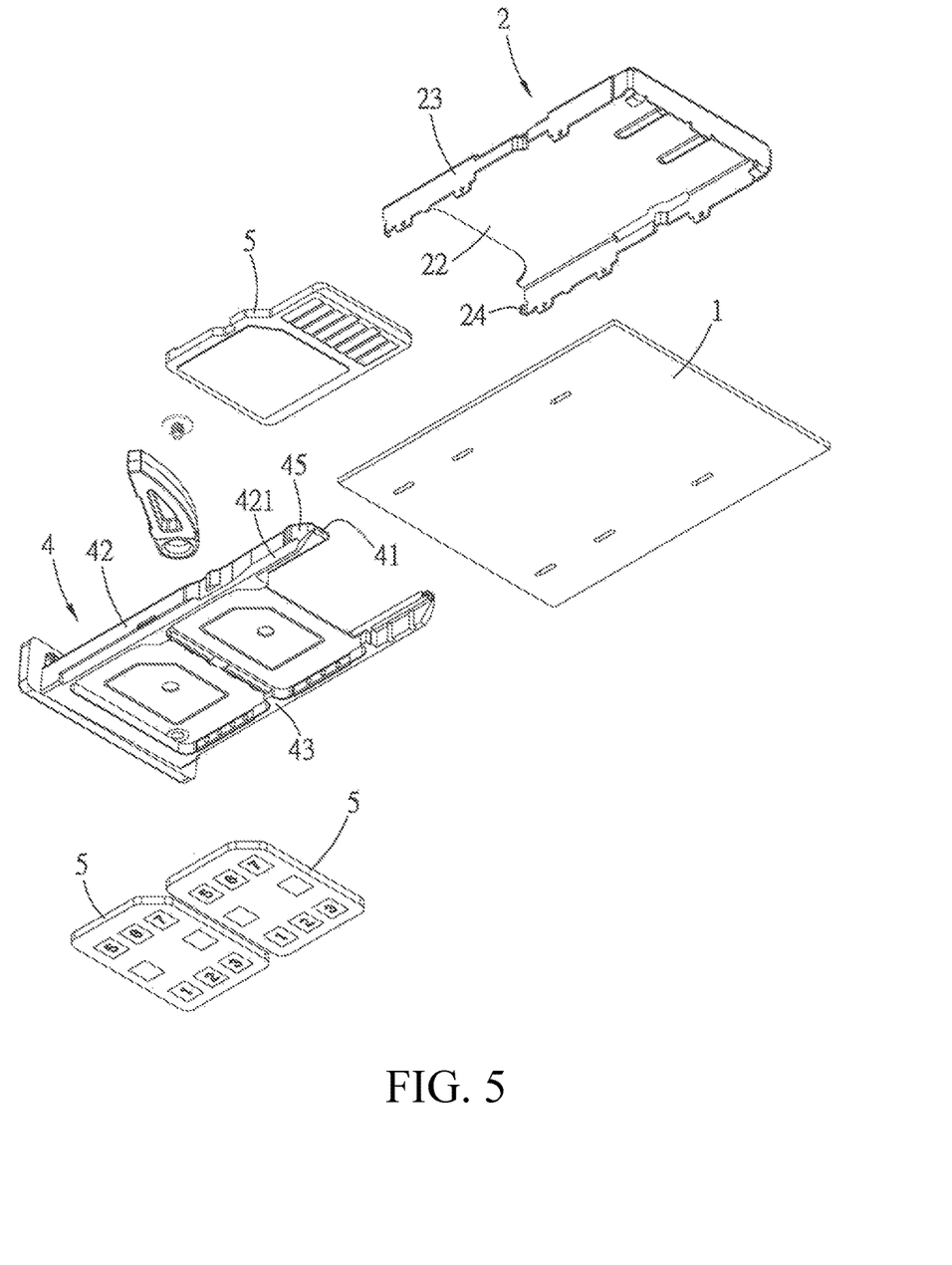
FIG. 5 a view of FIG. 4 viewed from another angle.
Figure 6:
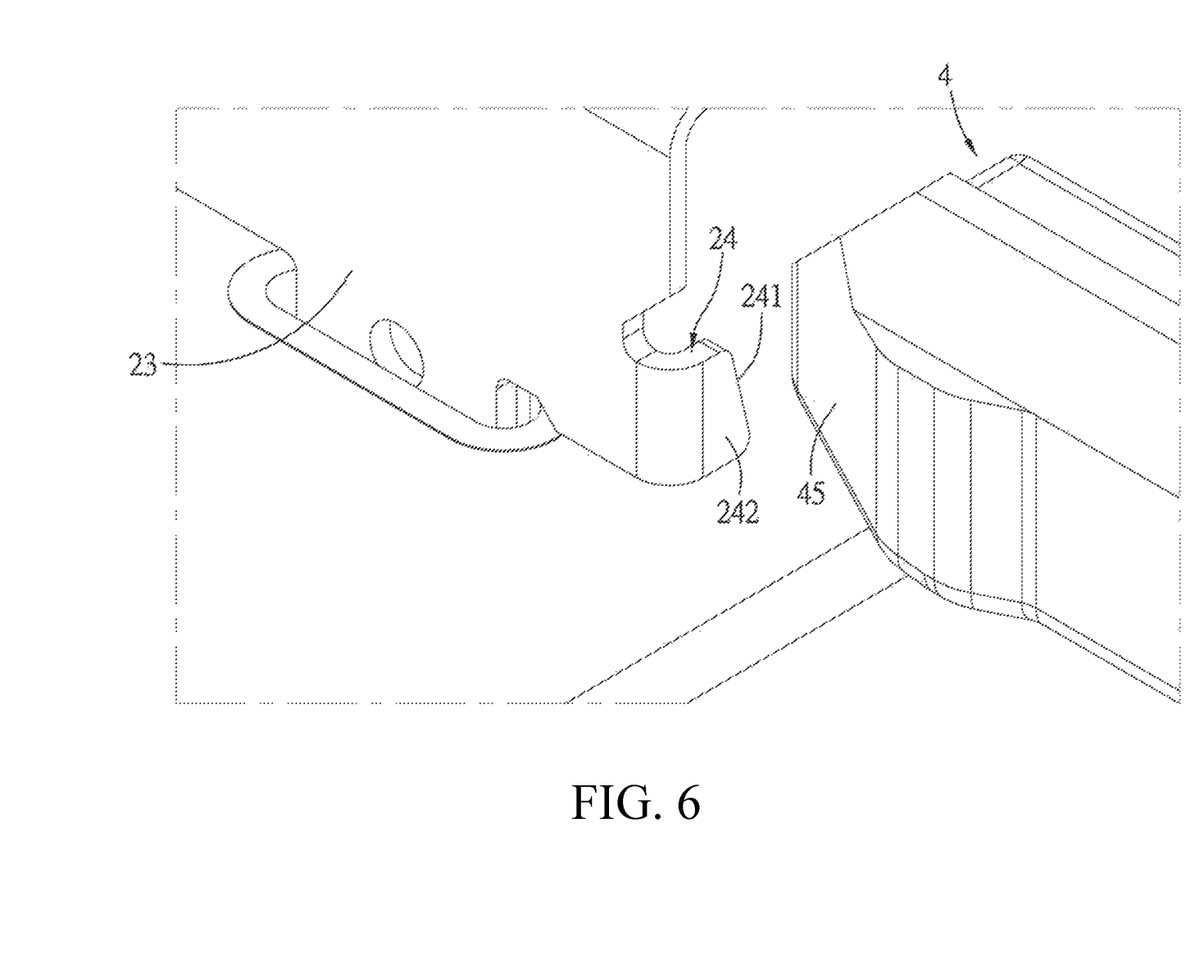
FIG. 6 is a partially exploded perspective view illustrating a structural relationship between an interference oblique surface of the tray and the limiting arm of the metal shell when the tray of the first embodiment is improperly inserted.
Figures 7, 8:
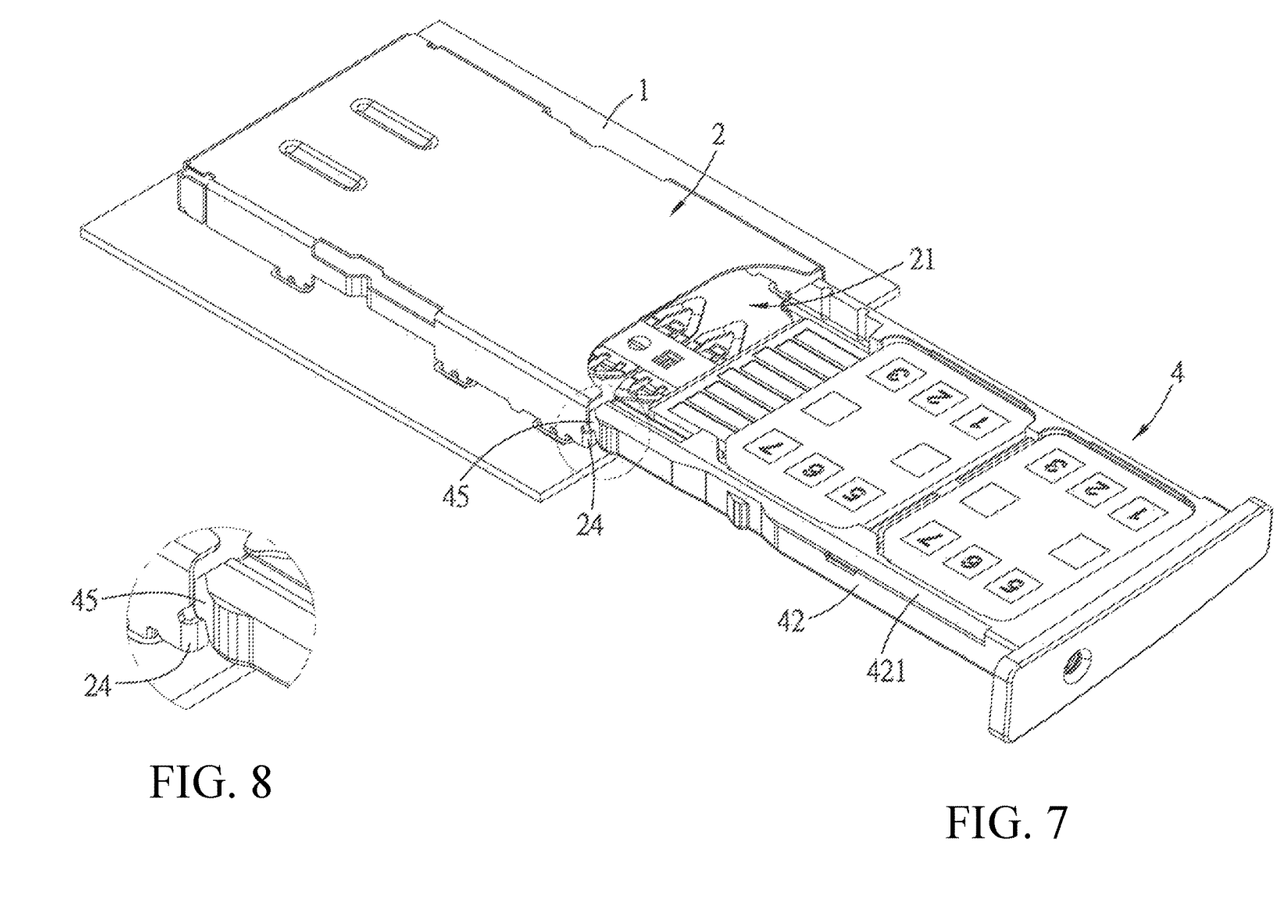
FIG. 7 is a perspective view illustrating that the tray is prevented from being inserted into the slot due to blocking of the limiting arm of the metal shell when the tray of the first embodiment is improperly inserted.
FIG. 8 is an partially enlarged view of FIG. 7 illustrating an interaction relationship between the limiting arm of the metal shell and the interference oblique surface of the tray when the tray of the first embodiment is improperly inserted.
Figure 9:
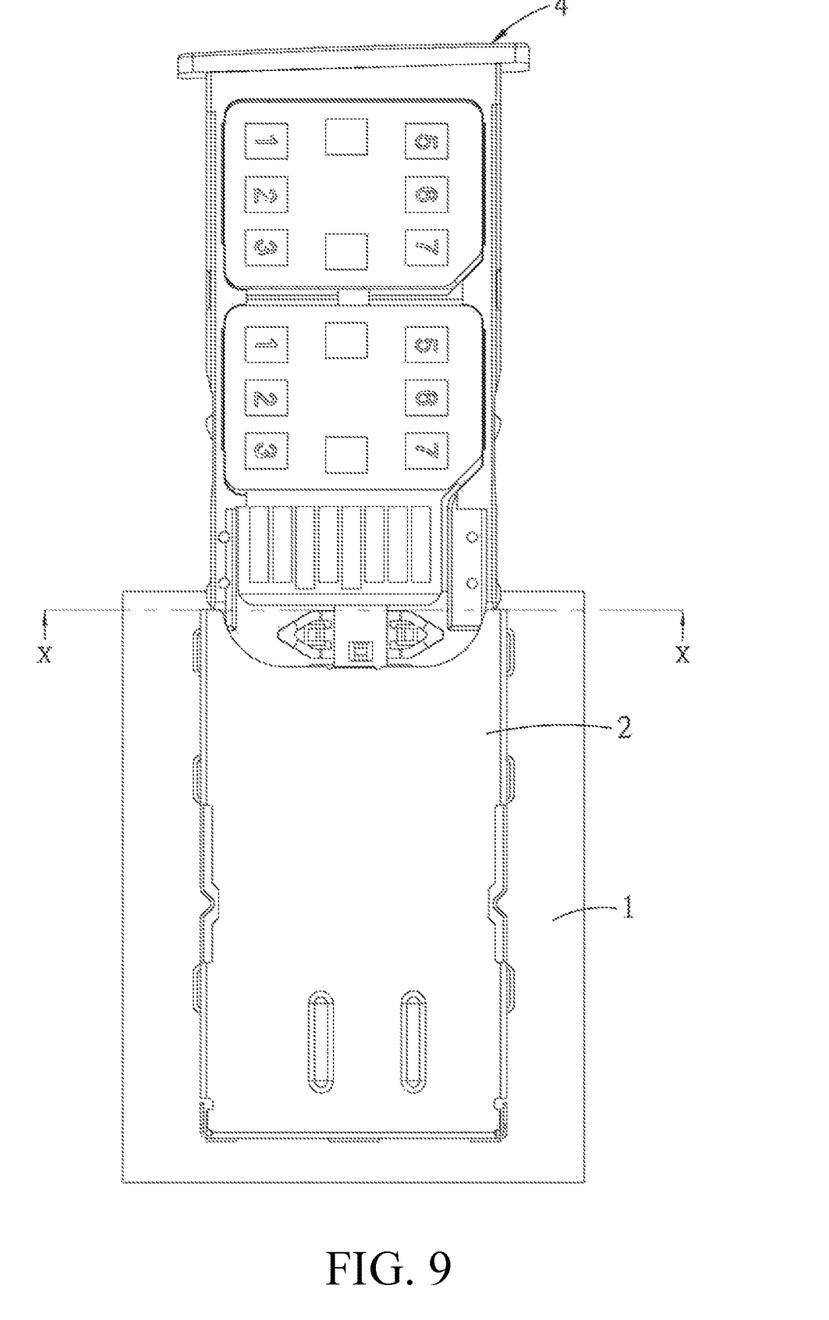
FIG. 9 is a top view of FIG. 7.
Figure 10:
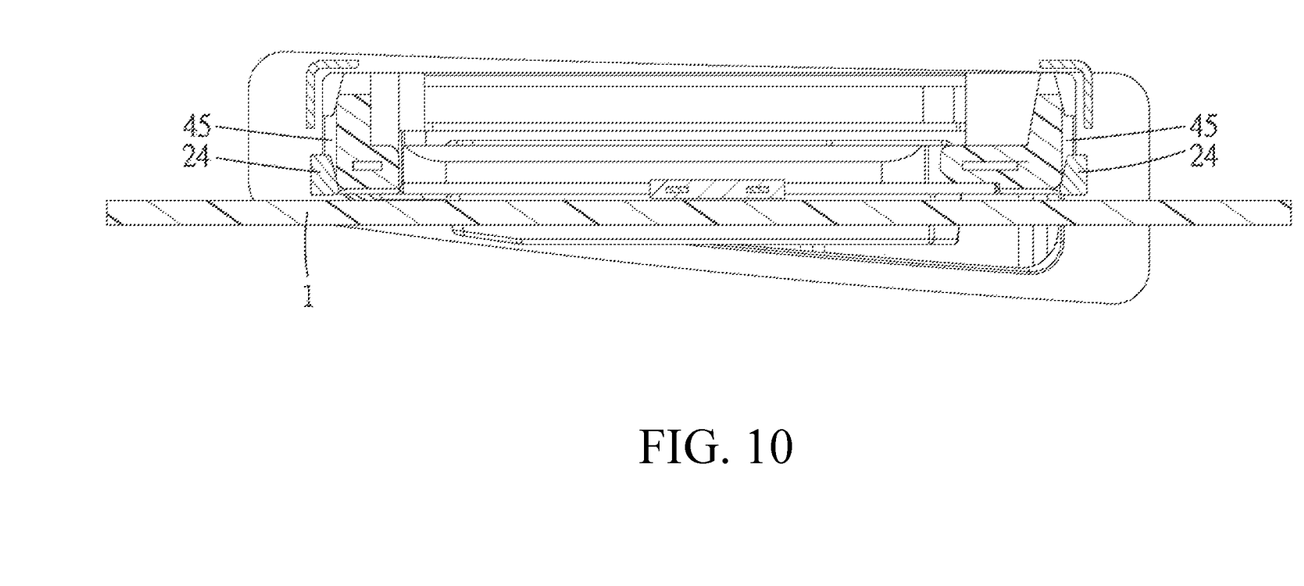
FIG. 10 is a cross sectional view taken along a line X-X of FIG. 9 and illustrating the interaction relationship between the limiting arm of the metal shell and the interference oblique surface of the tray when the tray of the first embodiment is improperly inserted.

The terminal block 3 is provided on the circuit board 1 and positioned in the slot 21. The tray 4 may be inserted into and ejected from the slot 21 via the entrance of the slot 21 along an inserting-ejecting direction A and may be used to carry an electronic card 5 to be received in the slot 21 so as to allow the electronic card 5 and the terminal block 3 to be electrically connected. In the embodiment, the tray 4 may carry one SD card and two SIM cards, and the three terminal blocks 3 are respectively electrically connected with the one SD card and two SIM cards. Each terminal block 3 comprises an insulative housing 31 and a plurality of terminals 32. The number and types of the electronic cards 5 carried by the tray 4 may be adjusted according to the actual requirement, certainly the terminal block 3 may be correspondingly adjusted with respect to the electronic card 5, for example, the tray 4 may carry only one electronic card 5, and only one terminal block 3 is provided correspondingly, and the present embodiment is not limited to this.

The tray 4 has an insertion end 41 which first enters into the slot 21 and two receiving portions 421 which are respectively parallel to two sides of the inserting-ejecting direction A, the two receiving portions 421 respectively correspond to the two limiting arms 24, so that when the tray 4 is properly inserted, the tray 4 enters into the slot 21 without blocking of the two limiting arms 24. In the embodiment, the tray 4 has two side surfaces 42 respectively facing the two side plates 23 of the metal shell 2, a bottom surface 43 facing the circuit board 1, and a top surface 44 opposite to the bottom surface 43. The two receiving portions 421 are respectively recessed from the two side surfaces 42 adjacent to the bottom surface 43. And further referring to FIG. 12, when the tray 4 is properly inserted into the slot 21, the tray 4 avoids the two limiting arms 24 of the metal shell 2 via two receiving spaces which are respectively formed by the two receiving portions 421 at the two sides, therefore the tray 4 may smoothly enter into the slot 21 without blocking of the two limiting arms 24. That is to say, when the tray 4 passes through the entrance of the slot 21, the two limiting arms 24 are respectively positioned in the two receiving spaces respectively formed by the two receiving portions 421.

The tray 4 further has two interference oblique surfaces 45 respectively parallel to the two sides of the inserting-ejecting direction A and adjacent to the insertion end 41, a distance between the two interference oblique surfaces 45 gradually increases along a direction away from the insertion end 41. Referring to FIG. 6 through FIG. 10, when the tray 4 is improperly inserted (that is the tray 4 is turned upside down and inserted), each interference oblique surface 45 abuts against a boundary between the side stopping surface 241 and the front stopping surface 242 of the corresponding limiting arm 24, so that the tray 4 cannot enter into the slot 21, thereby attaining the fool-proof effect. Because the distance between the two interference oblique surfaces 45 of the tray 4 gradually increases along the direction away from the insertion end 41, when the side stopping surfaces 241 of the limiting arm 24 and the corresponding interference oblique surface 45 contact each other, one component force of a force that the interference oblique surface 45 applies on the limiting arm 24 is toward the side stopping surface 241 and the other component force of the force is toward the front stopping surface 242, thereby dispersing the force toward different directions, meanwhile, the unidirectional reaction force of the limiting arm 24 applied on the interference oblique surface 45 is also reduced, which may reduce the risk of the scrapping the tray 4, thereby preventing the tray 4 from forcedly squeezing into the slot 21. Moreover, even if the interference oblique surface 45 is scraped to form a recessed part and in turn the area abutting against the front stopping surface 242 is increased, the tray 4 can be prevented from entering into the slot 21.

Figure 11:
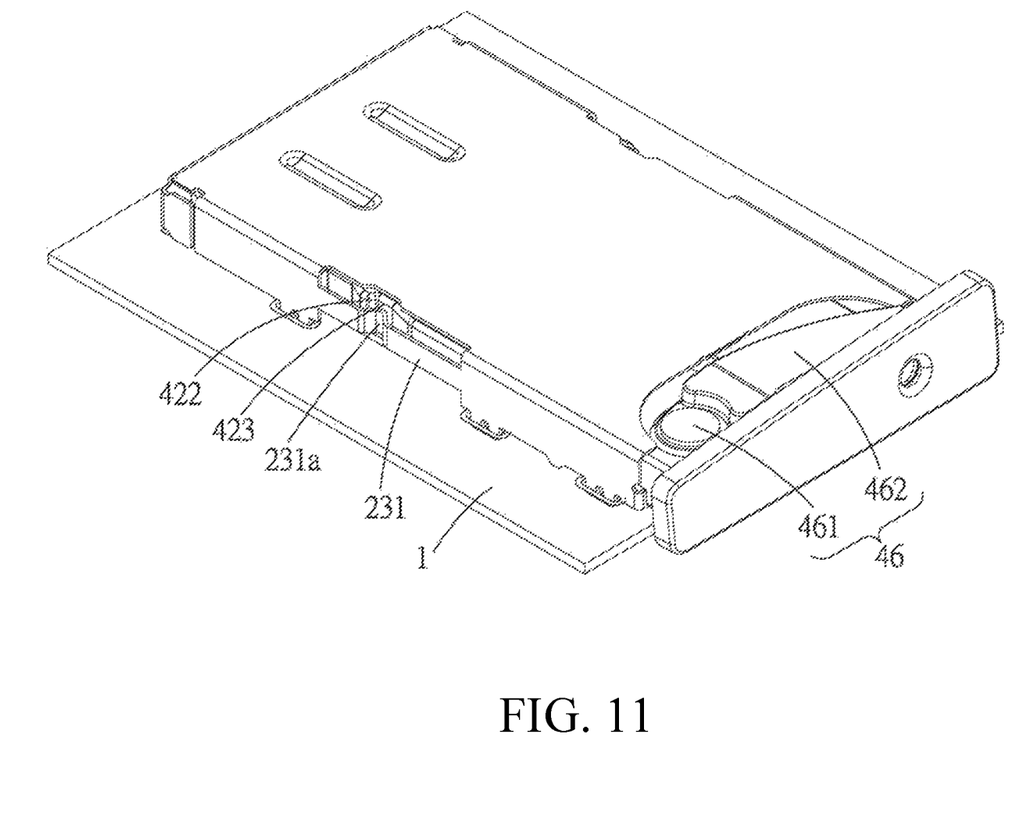
FIG. 11 is a perspective view illustrating that the tray is inserted into the slot in the first embodiment.
Figure 12:
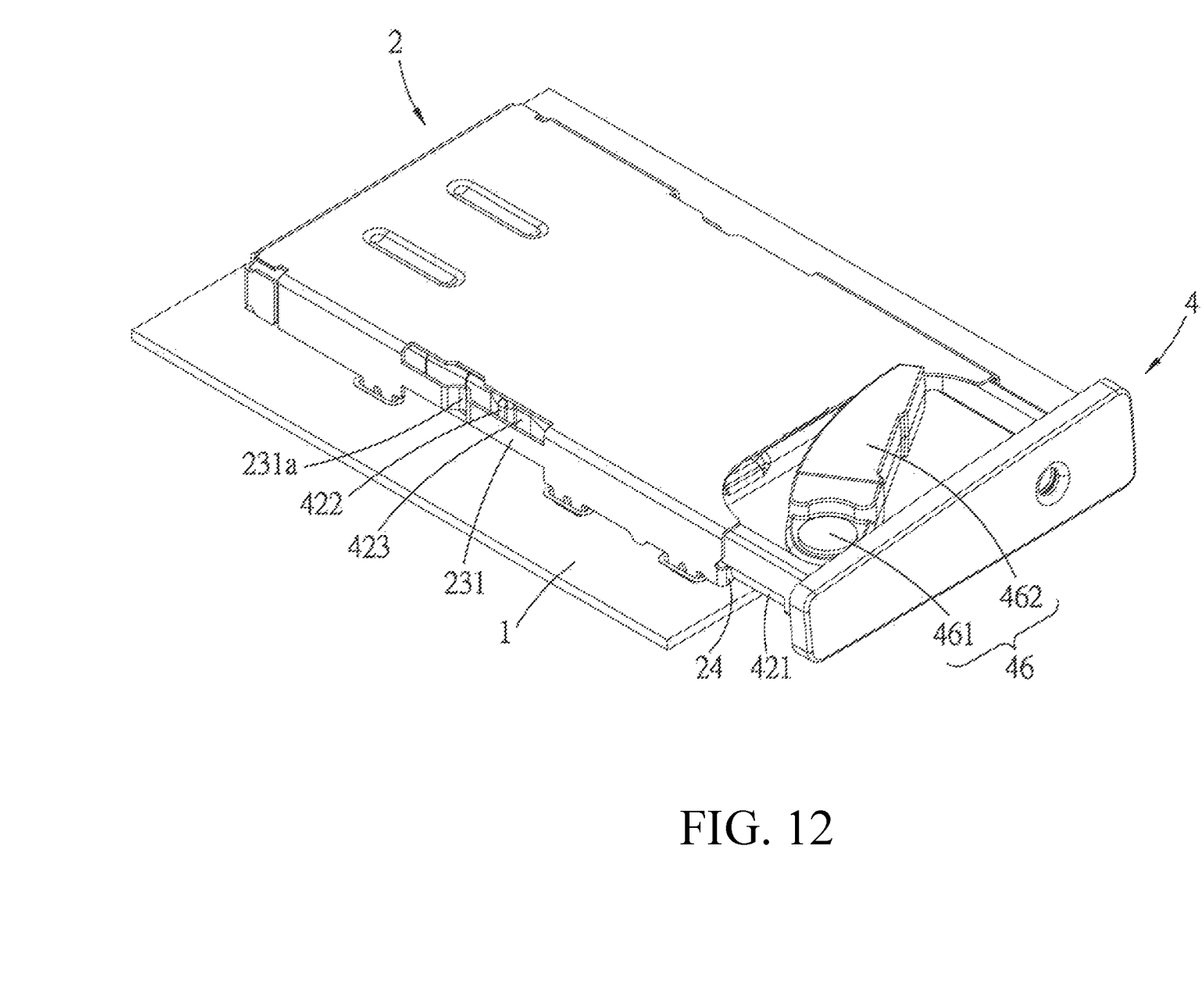
FIG. 12 is a perspective view illustrating that the tray of the first embodiment is ejected from the slot via a card ejecting mechanism.

Referring to FIG. 1, FIG. 11 and FIG. 12, the two side surfaces 42 of the tray 4 each are formed with a latching block 422 and a latching groove 423, the latching block 422 and the latching groove 423 of each side surface 42 are provided along the inserting-ejecting direction A and adjacent to each other; the two side plates 23 of the metal shell 2 each have a linear elastic section 231 which is separated from the top plate 22, and the elastic section 231 has a latching portion 231a bent and protruding toward the inside of the slot 21, when the tray 4 is inserted into the slot 21 and reaches a predetermined position, the two latching portions 231a of the metal shell 2 are respectively latched into the two latching grooves 423 at the two sides of the tray 4 and respectively stop the two latching blocks 422 to move toward the entrance of the slot 21 so as to limit the tray 4. The two side plates 23 of the metal shell 2 further each have two mounting sections 232 respectively connected with two ends of the corresponding elastic section 231, each mounting section 232 has at least a soldering portion 232a soldered to the circuit board 1. Because the latching portion 231a is formed by bending the elastic section 231, both of two ends of the latching portion 231a are supported, therefore the latching portion 231a has a higher structure strength, can allow repeated insertion and ejection of the tray 4 and will not be deformed. Furthermore, the mounting sections 232 respectively connected to the two ends of the elastic section 231 each are fixed to the circuit board 1 via the corresponding soldering portion 232a, which can further increase the structure strength of the elastic section 231. Moreover, the tray 4 further has a card ejecting mechanism 46, the card ejecting mechanism 46 comprises a fixing shaft 461 and an operating bar 462. The operating bar 462 rotates around the fixing shaft 461, and may be operated by an operator so as to eject the tray 4 from the slot 21.

Figure 13:
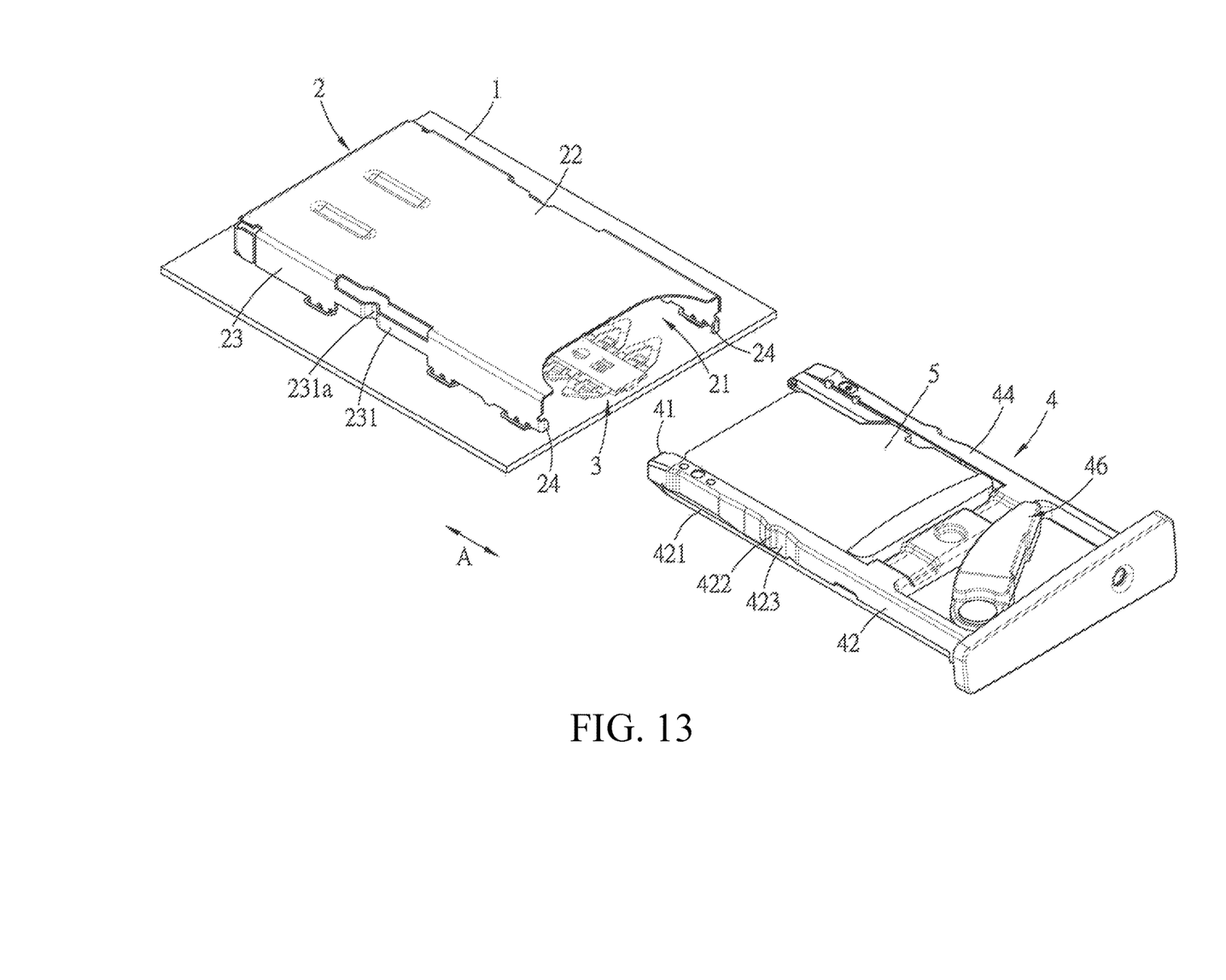
FIG. 13 is a view similar to FIG. 1 and illustrating an electronic card connector of a second embodiment of the present disclosure.
Figure 14:
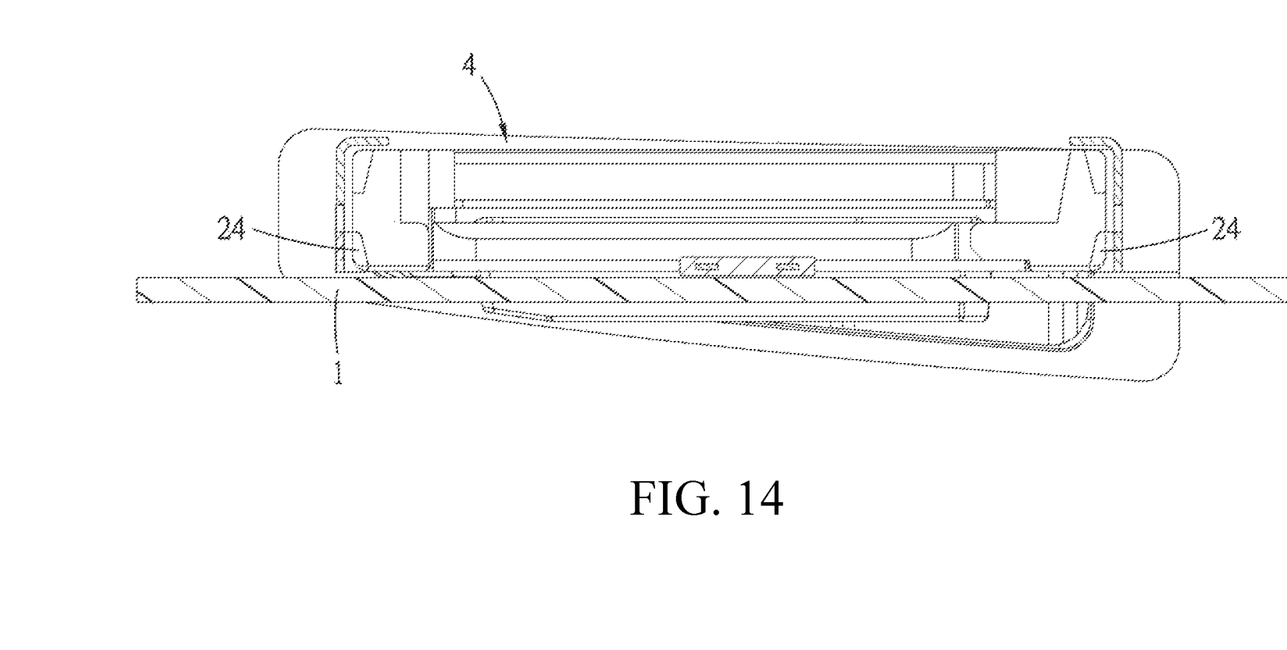
FIG. 14 is a view similar to FIG. 10 and illustrating an interaction relationship between a limiting arm of a metal shell and the tray when the tray of the second embodiment is improperly inserted.

Referring to FIG. 13 and FIG. 14, an electronic card connector of a second embodiment of the present disclosure is substantially the same as that of the first embodiment, however, in the second embodiment, a width between the two sides of the insertion end 41 of the tray 4 is wider than that of the first embodiment and the interference oblique surface 45 is eliminated, when the tray 4 is improperly inserted (that is the tray 4 is turned upside down and inserted), two parts of the insertion end 41 respectively adjacent to the two sides of the insertion end 41 of the tray 4 respectively abut against the two front stopping surfaces 242 of the two limiting arms 24, so that the tray 4 cannot enter into the slot 21. In the embodiment, two end surfaces respectively adjacent to the two sides of the tray 4 respectively abut against the two front stopping surfaces 242 of the two limiting arms 24. The tray 4 is blocked by the two front stopping surfaces 242 of the two limiting arms 24, therefore a contact area between each limiting arm 24 and the tray 4 is larger, which may disperse the force that the tray 4 applies on each limiting arm 24, thereby reducing the risk of scrapping the tray 4.

In conclusion, when the tray 4 is improperly inserted (that is the tray 4 is turned upside down and inserted), because the side stopping surface 241 of the limiting arm 24 abuts against the interference oblique surface 45 of the tray 4, the force applied by the interference oblique surface 45 may be dispersed toward different directions, thereby reducing the risk of scrapping the tray 4 and assuring the fool-proof function. Similarly, because the front stopping surface 242 of the limiting arm 24 stops the tray 4, the contact area between each limiting arm 24 and the tray 4 is larger, the force that the tray 4 applies on each limiting arm 24 may be dispersed, thereby reducing the risk of scrapping the tray 4, and also ensuring the fool-proof function. Moreover, the latching portion 231a bent from the linear elastic section 231 has a higher structure strength, so the latching portion 231a can allow repeated insertion and ejection of the tray 4 and the latching portion 231a will not be deformed.

The above described contents are only the embodiments of the present disclosure, which cannot limit the scope of the implementation of the present disclosure, namely simple equivalent variations and modifications made according to the claims and the content of the present disclosure are still fallen within the scope of the present disclosure.

What is claimed is:

1. An electronic card connector provided on a circuit board, the electronic card connector comprising:
   a metal shell provided on the circuit board, the metal shell cooperating with the circuit board to define a slot, the metal shell having a top plate which is spaced apart from and faces the circuit board, two side plates which are respectively connected to two sides of the top plate and face each other, and two limiting arms which are respectively bent from two end edges of the two side plates adjacent to an entrance of the slot and perpendicular to the top plate and extend toward each other, each limiting arm being spaced apart from the top plate and having a side stopping surface toward the other limiting arm and a front stopping surface toward the outside of the slot;

a terminal block provided on the circuit board and positioned in the slot; and a tray inserted into and ejected from the slot via the entrance of the slot along an inserting-ejecting direction and used to carry an electronic card to be received in the slot so as to allow the electronic card and the terminal block to be electrically connected, the tray having an insertion end which first enters the slot and two receiving portions which are respectively parallel to two sides of the inserting-ejecting direction, the two receiving portions respectively corresponding to the two limiting arms, so that when the tray is properly inserted, the tray entering into the slot without blocking of the two limiting arms, the tray further having two interference oblique surfaces respectively parallel to the two sides of the inserting-ejecting direction and adjacent to the insertion end, a distance between the two interference oblique surfaces gradually increasing along a direction away from the insertion end; when the tray is improperly inserted under a state that the tray is turned upside down, each interference oblique surface abutting against a boundary between the side stopping surface and the front stopping surface of the corresponding limiting arm, so that the tray cannot enter into the slot.

2. The electronic card connector according to claim 1, wherein the two limiting arms extend into the slot.

3. The electronic card connector according to claim 1, wherein the tray has two side surfaces respectively facing the two side plates of the metal shell, a bottom surface facing the circuit board, and a top surface opposite to the bottom surface, the two receiving portions are respectively recessed from the two side surfaces adjacent to the bottom surface.

4. The electronic card connector according to claim 3, wherein
the two side surfaces of the tray each are respectively formed with a latching block and a latching groove, the latching block and the latching groove of each side surface are provided along the inserting-ejecting direction and adjacent to each other;
the two side plates of the metal shell each have a linear elastic section which is separated from the top plate, and the elastic section has a latching portion bent and protruding toward the inside of the slot;
when the tray is inserted into the slot and reaches a predetermined position, the two latching portions of the metal shell are respectively latched into the two latching grooves at the two sides of the tray and respectively stop the two latching blocks to move toward the entrance of the slot so as to limit the tray.

5. The electronic card connector according to claim 4, wherein the two side plates of the metal shell further each have two mounting sections respectively connected with the two ends of the corresponding elastic section, each mounting section has at least a soldering portion soldered to the circuit board.

6. An electronic card connector provided on a circuit board, the electronic card connector comprising:
a metal shell provided on the circuit board, the metal shell cooperating with the circuit board to define a slot, the metal shell having a top plate which is spaced apart from and faces the circuit board, two side plates which are respectively connected to two sides of the top plate and face each other, and two limiting arms which are respectively bent from an end edge of the two side plates adjacent to an entrance of the slot and perpendicular to the top plate and extend toward each other, each limiting arm being spaced apart from the top plate and having a front stopping surface toward the outside of the slot;

a terminal block provided on the circuit board and positioned in the slot; and a tray inserted into and ejected from the slot from the entrance of the slot along an inserting-ejecting direction and used to carry an electronic card to be received in the slot so as to allow the electronic card and the terminal block to be electrically connected, the tray having an insertion end which first enters the slot and two receiving portions which are respectively parallel to the two sides of the inserting-ejecting direction, the two receiving portions respectively corresponding to the two limiting arms, so that when the tray is properly inserted, the tray entering into the slot without blocking of the two limiting arms; when the tray is improperly inserted under a state that the tray is turned upside down, two parts of the insertion end respectively adjacent to the two sides of the insertion end respectively abutting against the two front stopping surface of the two limiting arms, so that the tray cannot enter into the slot.

7. The electronic card connector according to claim 6, wherein the two limiting arms extend into the slot.

8. The electronic card connector according to claim 6, wherein the tray has two side surfaces respectively facing the two side plates of the metal shell, a bottom surface facing the circuit board, and a top surface opposite to the bottom surface, the two receiving portions are respectively recessed from the two side surfaces adjacent to the bottom surface.

9. The electronic card connector according to claim 8, wherein
the two side surfaces of the tray each are respectively formed with a latching block and a latching groove, the latching block and the latching groove of each side surface are provided along the inserting-ejecting direction and adjacent to each other;
the two side plates of the metal shell each have a linear elastic section which is separated from the top plate, and the elastic section has a latching portion bent and protruding toward the inside of the slot;
when the tray is inserted into the slot and reaches a predetermined position, the two latching portions of the metal shell are respectively latched into the two latching grooves at the two sides of the tray and respectively stop the two latching blocks to move toward the entrance of the slot so as to limit the tray.

10. The electronic card connector according to claim 9, wherein the two side plates of the metal shell further each have two mounting sections respectively connected with the two ends of the corresponding elastic section, each mounting section has at least a soldering portion soldered to the circuit board.

* * * * *